Nov. 2, 1948.  E. G. VICTOR  2,452,969
PIE CONTAINER
Filed April 30, 1946
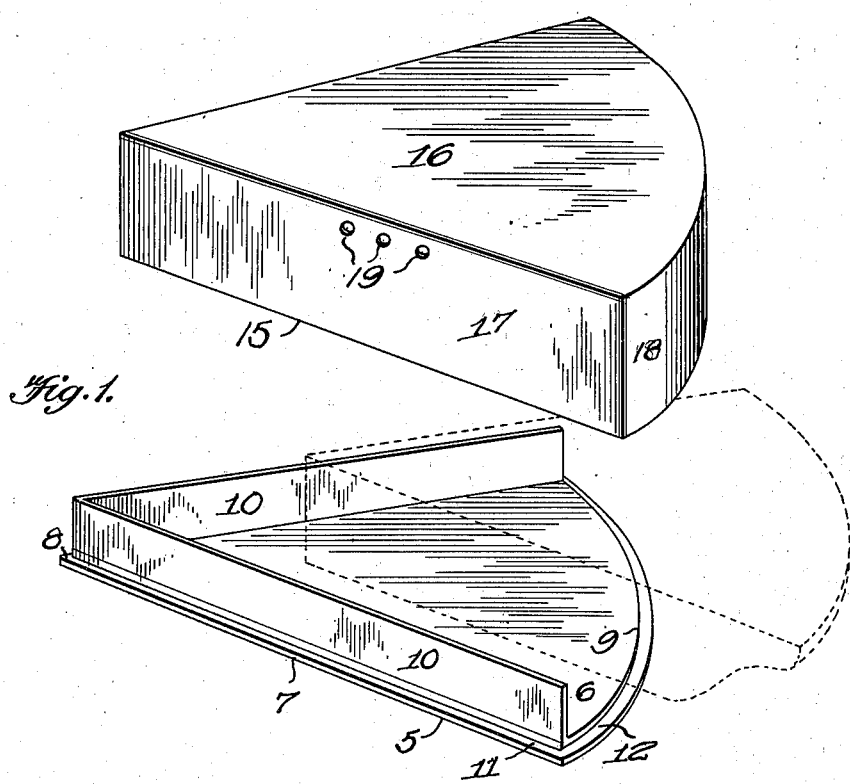
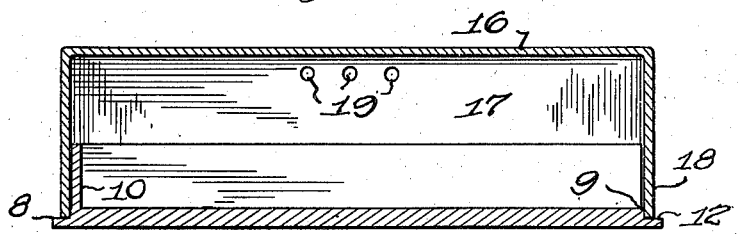
INVENTOR.
Eva G. Victor.
BY
Bryant & Lowry
Attorneys.

Patented Nov. 2, 1948

2,452,969

UNITED STATES PATENT OFFICE 2,452,969

PIE CONTAINER

Eva G. Victor, Mansfield, Ohio

Application April 30, 1946, Serial No. 666,050

3 Claims. (Cl. 206—4)

This invention relates to improvements in pie containers and has particular relation to containers designed for use by those carrying lunch boxes and the like.

A piece of pie is one of the favorite desserts of workmen and others required to carry a lunch for the midday food replenishment, the food being carried in suitable lunch box structures, these being generally of reasonable size into which the food must be stored in rather compact fashion. Under such conditions the question of the disposition of a commodity such as a piece of pie becomes somewhat serious, due to the particular characteristics of the pie itself. The pie segment is generally of a somewhat triangular section of the baked pie, so that the content is not self enclosed by the pie crust; if the content is juicy—with generally a top crust—the open sides permit the juices to escape; if it be of custard or similar type, the top crust is generally omitted, leaving the filling exposed on the top as well as the sides—and where the filling includes a meringue covering layer, the latter is so fragile and of soft characteristic as to make it very vulnerable. The positioning of a commodity such as this within a compactly-packed lunch box becomes a rather serious problem if the appearance and other characteristics of the piece are to be maintained.

The present invention is designed to meet this problem by the provision of a container within which the pie segment can be readily positioned and from which it can be readily removed without damaging the appearance of the piece of pie, so that the latter will preserve its tasty appearance at the luncheon period. The container has the characteristic appearance of a sector and is formed of a base member and a cover with the periphery presenting the characteristics of a sector and is preferably formed of plastic material to thereby provide a rigid but light-weight construction and able to sustain material pressures applied on the surface of the laden container, also permitting ready cleansing after use, and which is not readily stained by escaping juices. The dimensions of the container in its closed position are such as to receive and carry a pie section of considerable depth without contacting the inner face of the top, and since the latter is rigid, the top of the content will be protected against external pressures of other foods which may be located thereon.

To these and other ends, therefore, the nature of which will be more clearly apparent as the invention is hereinafter disclosed, said invention consists in the improved construction and combination of parts hereinafter more particularly described, illustrated in the accompanying drawings, and more particularly pointed out in the appended claims.

In the accompanying drawing, in which similar reference characters indicate similar parts in each of the views—

Figure 1 is a perspective view of the invention with the cover raised from the base, a pie section being indicated in dotted lines.

Figure 2 is a vertical sectional view taken radially of the sector, with the cover in position on the base.

The base or supporting member 5 is shown as formed with a bottom 6 the contour of which has the characteristics of a sector (a section of the area within a circle); two radii of the circle form the sides 7 and 8 of the sector, the end 9 corresponding approximately to the arc of the circle between such radii. The bottom carries two vertical walls 10 which are positioned inside of and parallel to the periphery of the sides 7 and 8 to provide a marginal portion 11 between such walls and the side peripheries, this margin being of less thickness than that of the main portion of the bottom, this margin being also continued along the arcuate end 9, such end being open, with the side walls extending to the inner limit of the end marginal zone. The base member thus tends to simulate an open-end tray the side walls of which are vertical and provide a conical appearance due to the location of the sides 7 and 8 parallel to such radii. The marginal zone 11 extends completely around the periphery of the bottom, so that in such end zone it presents the characteristics of a step with respect to the upper face of the main portion of the bottom.

The side walls 10 are of suitable height, preferably less than the overall height of the container, but materially exceed the thickness of the under crust of the pie to thereby form a side barrier effect for at least a material part of a piece of pie in which the content is of the juicy type. Since the cut of pie can be slid onto the bottom and advanced to an approximate fit with the side walls, the latter will tend to retain the juices against escape from the pie cut, assuming the cut to have the approximate dimensions of the conical bottom; while a smaller segment of pie cut may not have such contact, the container is formed of such material that escape of juices onto the bottom will not materially damage the latter, as presently explained. The cut of pie is designed to be positioned on the bottom by being introduced through the open arcuate end and slide forward over the bottom, thus avoiding excessive handling of the cut; when the cut is to be removed, it is necessary only to remove the cover and then tilt the base member sufficient to cause the pie to slide out on to a suitable support—which may be a plate, table, etc., or a hand of the user. In Figure 1 a cut of pie X is indicated in dotted lines as partially positioned on the bottom.

The cover 15 is formed with a top 16 having the sector-shaped appearance provided by the base, but its overall dimensions are slightly less than these of bottom 6, so that when the cover is seated on the base, a portion of the width of marginal zone 11 will remain exposed, as indicated in Figure 2. The top carries depending side walls 17 and end wall 18, the latter being an arcuate wall. The inner dimensions of such walls are such as to fit over side walls 10 and seat on the marginal zone 11, 12, with the internal height sufficient to freely receive the pie cut even though the latter includes a coating of merinque or the like—for instance, a depth of one and one-half inch. If desired, the cover may have one or more openings 19 near the top of the side walls, thus permitting escape of heated air, etc., from the interior of the container which would otherwise be completely closed.

The container is preferably formed from plastic material, thus enabling ready molding to the desired dimensions, and providing a structure of light weight but having sufficient rigidity to prevent collapsing excepting under pressures not encountered in this service; hence, the cut of pie will be adequately protected, even when located at the bottom of the lunch box, a position which is desirable since the lunch box is carried and rested bottom down, assuring that the cut of pie will then retain its seat at the bottom of the container and leaving the top undisturbed to present its tasty condition.

As indicated in Figure 2, the height of walls 10 is material—shown as approaching the mid-height of the interior of the cover; this height is not arbitrary, but may be increased, the height shown being approximately the minimum, since it is desirable that it tend to protect the cut sides of the pie, as well as produce a sufficient area to tend to retain the cover in definite position. While the cover dimensions are such as to permit its ready removal, the fit is preferably such as to tend to prevent completely free movement upwardly, the openings 19 being positioned solely above the top plane of the side walls of the base member when the cover is positioned on the base member, said openings preventing any trapping of excess air within the container such as could apply pressure on a delicate cut of pie, the holes also preventing any tendency in the direction of vacuum effects within the container, thus assuring ready opening of the container by withdrawal of the cover.

As indicated in Figure 2, the thickness of walls 17 is sufficiently less than the width of the marginal zone 12, as to assure the presence of a complete peripherally-exposed ledge of bottom 6. This is of advantage during the opening and closing of the container, since the user can grasp the opposite sides of the bottom with the thumb and fingers, with the little finger engaging the end zone—of one hand, with the opposite hand engaging the sides and end of the cover in a similar manner, thus enabling the cover to be readily moved to and from its closed position even though the fit is fairly close, with the movement providing little liability of disturbing the cut of pie contained within the container. Obviously, the cut of pie can be moved into and out of its position within the base through the open end of the latter with minimum liability of disturbing the appearance and integrity of the cut of pie itself. As will be seen, the cover has the lower edges of its side and arcuate walls extending on a common plane and thus has complete contact with the upper face of the marginal zone 12 throughout the perimeter zone of the base member. In the closed position of the cover, therefore, the latter encloses the side walls 10 of the base member and additionally provides a step closure effect within the arcuate zone of the base member bottom, the lower marginal zone of the arcuate end of the cover projecting below the top plane of the bottom of the base member to produce such effect. Due to the latter, it is apparent that should there be any material movement of the pie content on the bottom of the base member, such content will be prevented from escaping from the interior of the container through the open arcuate end zone of the base member, the step closure produced by the arcuate wall of the cover effectively preventing material seepage from the interior at such point.

As will be understood, the structure can be readily cleansed after use, the plastic material permitting this by a simple rinsing operation, and also tending to reduce liability of staining where the pie content is of the juicy type. And the structure is such as to be somewhat inexpensive to produce and is so formed as to be capable of use for long periods due to its indestructibility.

While I have herein shown and described a preferred form of the invention it will be understood that changes or modifications therein may be found desirable or essential in meeting the exigencies of service or the individual desires of users, and I reserve the right to make any and all such changes or modifications therein as may be deemed desirable or essential, insofar as the same may fall within the spirit and scope of the invention as expressed in the accompanying claims, when broadly construed.

I claim:

1. In containers for housing pie segments for transportation purposes and the like, a container formed of plastic material and comprising a base member having a bottom the contour of which is of sector form with the radius length together with the length of the arcuate end greater than the similar length of the pie segment to be housed, said member having vertical side walls extending parallel with and spaced from the radical side walls of the bottom, the bottom having a marginal zone depressed with respect to the top plane of the bottom positioned outside such side walls and with the arcuate end formed with a similar depressed marginal zone, whereby the arcuate end of the member is free from a confining wall and the area within the side walls is sufficient to accommodate a pie segment, and a cover for the base member, said cover having a top also sector-shaped in contour, depending side walls and an arcuate end wall, the vertical dimensions of said vertical walls being materially greater than those of the side walls of the base member and with the internal dimensions of the cover sufficient to receive the side walls of the base member with an approximate fit, the lower edge of the side and arcuate end walls of the cover extending on a common plane and being completely seatable on the depressed marginal zone of the base member throughout the perimeter of the latter, the lower marginal zone of the cover arcuate wall co-operating with the complemental portion of the depressed marginal zone to produce a step closure effect active in preventing escape of pie content from the container interior at the arcuate end of the container.

2. A container as in claim 1 characterized in that the width of the marginal zone of the base member is sufficiently greater than the thickness of the vertical walls of the cover as to present a margin of the top of such zone as exposed throughout the peripheral contour of the base member when the cover is in its housing position, the top face of such depressed marginal zone extending on a plane below that of the top face of the bottom of the base member.

3. A container as in claim 1 characterized in that the side walls of the cover are formed with one or more openings leading to the interior of the cover adjacent the top, said openings being positioned solely above the top plane of the side walls of the base member.

EVA G. VICTOR.

REFERENCES CITED

The following references are of record in the file of this patent:

UNITED STATES PATENTS

| Number | Name | Date |
| --- | --- | --- |
| 370,945 | Holt | Oct. 4, 1887 |
| 1,470,763 | Richards | Oct. 16, 1923 |
| 1,848,120 | Fisher | Mar. 8, 1932 |
| 2,388,442 | Reyburn | Nov. 6, 1945 |